US012395898B2

(12) United States Patent
Anzawa et al.

(10) Patent No.: US 12,395,898 B2
(45) Date of Patent: Aug. 19, 2025

(54) COMMUNICATION DEVICE AND METHOD

(71) Applicant: NTT DOCOMO, INC., Tokyo (JP)

(72) Inventors: Masashi Anzawa, Tokyo (JP); Daiki Takeda, Tokyo (JP); Hiroki Ishizuka, Tokyo (JP); Koji Hiratsuka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 636 days.

(21) Appl. No.: 17/785,333

(22) PCT Filed: Dec. 15, 2020

(86) PCT No.: PCT/JP2020/046829
§ 371 (c)(1),
(2) Date: Jun. 14, 2022

(87) PCT Pub. No.: WO2021/125191
PCT Pub. Date: Jun. 24, 2021

(65) Prior Publication Data
US 2023/0027788 A1 Jan. 26, 2023

(30) Foreign Application Priority Data
Dec. 18, 2019 (JP) ................................. 2019-228325

(51) Int. Cl.
*H04W 28/24* (2009.01)
*H04W 24/08* (2009.01)

(52) U.S. Cl.
CPC .......... *H04W 28/24* (2013.01); *H04W 24/08* (2013.01)

(58) Field of Classification Search
USPC .... 370/229, 230, 230.1, 235, 236, 241, 252, 370/328, 329, 330, 332, 39, 5.21
See application file for complete search history.

(56) References Cited

U.S. PATENT DOCUMENTS 6,538,992 B1 * 3/2003 Subbiah ............. H04Q 11/0478
370/395.21
6,647,265 B1 * 11/2003 Olofsson ............... H04L 47/821
455/433

(Continued)

FOREIGN PATENT DOCUMENTS

| JP | 2002-538637 A | 11/2002 |
|---|---|---|
| JP | 2013-527652 A | 6/2013 |
| JP | 2014-011750 A | 1/2014 |

OTHER PUBLICATIONS

International Search Report issued in PCT/JP2020/046829 on Mar. 2, 2021 (5 pages).

(Continued)

*Primary Examiner* — Nguyen H Ngo
(74) *Attorney, Agent, or Firm* — Osha Bergman Watanabe & Burton LLP

(57) ABSTRACT

Disclosed is a communication device capable of communicating with a terminal that performs wireless communication. The communication device includes a receiver configured to receive a request for network quality requirements from the terminal; a calculator configured to calculate network quality requirements available to the terminal; a determination unit configured to compare the request with the available network quality requirements to determine whether the request is acceptable; and a transmitter configured to transmit the result of the determination to the terminal.

5 Claims, 7 Drawing Sheets

(56) References Cited

U.S. PATENT DOCUMENTS

| | | | | |
|---|---|---|---|---|
| 2010/0014422 A1* | 1/2010 | Lee | ............... | H04W 28/02 |
| | | | | 370/230 |
| 2016/0037379 A1* | 2/2016 | Shafiee | ............ | H04W 28/0268 |
| | | | | 370/230.1 |
| 2021/0266781 A1* | 8/2021 | Alkurd | ............... | H04L 41/40 |

OTHER PUBLICATIONS

Written Opinion of the International Searching Authority issued in PCT/JP2020/046829 on Mar. 2, 2021 (4 pages).
3GPP TS 23.501 V15.7.0; "3rd Generation Partnership Project; Technical Specification Group Services and System Aspects; System Architecture for the 5G System (5GS); Stage 2 (Release 15)"; Sep. 2019 (243 pages).

* cited by examiner

COMMUNICATION DEVICE AND METHOD

TECHNICAL FIELD

The present invention relates to a communication device and a communication method in a wireless communication system.

BACKGROUND ART

The 3rd Generation Partnership (3rd GPP) project is considering a wireless communication system called 5G or NR (hereinafter, the wireless communication system is referred to as "5G" or "NR"), in order to achieve further increase in system capacity, further increase in data transmission speed, and further decrease in the latency in the wireless section. In 5G, various wireless technologies are being discussed in order to achieve a throughput of 10 Gbps or higher and to meet the request of the latency of 1 ms or less in the wireless section.

In NR, a network architecture including 5GC (5G Core Network) corresponding to EPC (Evolved Packet Core), which is the core network in the LTE (Long Term Evolution) network architecture, and NG-RAN (Next Generation-Radio Access Network) corresponding to E-UTRAN (Evolved Universal Terrestrial Radio Access Network), which is the RAN (Radio Access Network) in the LTE network architecture, is under consideration (for example, Non-Patent Document 1).

RELATED-ART DOCUMENT

Non-Patent Document

[Non-Patent Document 1] 3GPP TS 23. 501 V15. 7. 0(2019-09)

DISCLOSURE OF INVENTION

Problems to be Solved by the Invention

There is a growing demand for line services that enable users to control network quality requirements on demand, as does the network infrastructure provided by NaaS (Network as a Service). In wired networks, NaaS is already available. In view of the introduction of 5GC in wireless networks and the support of wireless functions such as URLLC (Ultra Reliable Low Latency Communications), NaaS may be provided by 5G wireless access.

In NaaS via 5G wireless access, if a user assumes on-demand changes to network quality requirements, the user may set network quality requirements before communication is initiated, through an application or web portal. For example, if the network is requested by a user to provide communication to which QoS (Quality of Service) is applied, one implementation method may be to indicate, to the user, communication quality that may be available, and determine the communication quality based on feedback from the user to provide communication.

However, the above method provides the user with the maximum communication quality that the network can provide. Since the resources held by the network are finite, it is desirable to specify a communication method that provides the minimum required communication quality for each user.

The present invention has been made in view of the above points, and it is an object of the present invention to provide communication in a wireless network in which QoS (Quality of Service) is applied in response to a request from a terminal.

Means for Solving the Problems

According to the disclosed technology, a communication device capable of communicating with a terminal that performs wireless communication is provided. The communication device includes a receiver configured to receive a request for network quality requirements from the terminal; a calculator configured to calculate network quality requirements available to the terminal; a determination unit configured to compare the request with the available network quality requirements to determine whether the request is acceptable; and a transmitter configured to transmit the result of the determination to the terminal.

Advantageous Effect of the Invention

According to the disclosed technology, communication may be provided in a wireless network to which the QoS (Quality of Service) is applied in response to a request from a terminal.

DESCRIPTION OF EMBODIMENTS

Hereinafter, embodiments of the present invention will be described with reference to the accompanying drawings. The embodiments described below are examples, and the embodiments to which the present invention is applied are not limited to the following embodiments.

In operating a wireless communication system according to an embodiment of the present invention, existing technologies are used as appropriate. However, the existing technology may, for example, be an existing LTE, but is not necessarily limited to an existing LTE. The term "LTE" as used herein shall also have a broad meaning including LTE-Advanced and LTE-Advanced or later forms (e.g., NR) or WLAN (Local Area Network), unless otherwise specified.

Further, in embodiments of the present invention, the parameter or the like "configured" may be a predetermined value or a parameter indicated by the base station 10, the terminal 20, the core network 30 or the QoS control web portal 40 may be configured.

Figure 1:
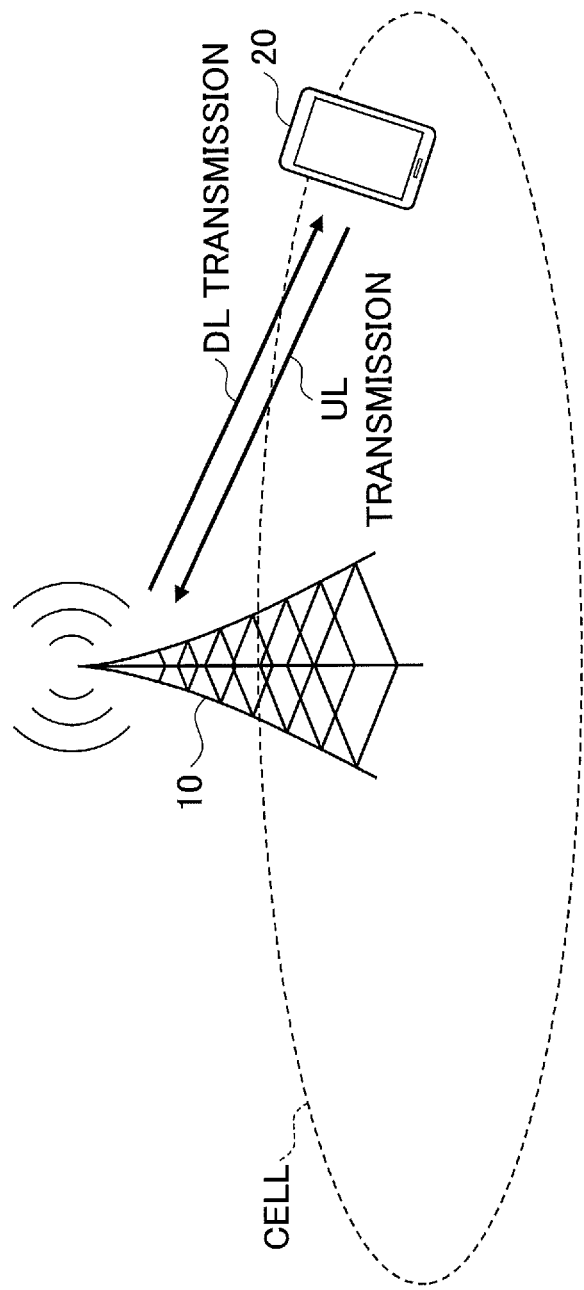
FIG. 1 is a diagram illustrating a wireless network according to an embodiment of the present invention.

FIG. 1 is a diagram illustrating a wireless network according to an embodiment of the present invention. A system including a wireless network in an embodiment of the present invention includes a base station 10 and a terminal 20, as illustrated in FIG. 1. In FIG. 1, one base station 10 and one terminal 20 are illustrated, but this is an example and may be more than one each. Base station 10 may be referred to as a network node.

The base station 10 is a communication device that provides one or more cells and performs wireless communication with the terminal 20. The physical resources of the radio signal are defined in the time domain and the frequency domain, the time domain may be defined in OFDM symbols, and the frequency domain may be defined in sub-carriers or resource blocks. The base station 10 transmits synchronization signals and system information to the terminal 20. The synchronization signals are, for example, NR-PSS (Primary Synchronization Signal) and NR-SSS (Secondary Synchronization Signal). System information is transmitted, for example, by NR-PBCH (Physical Broadcast Channel), also called informational information. As illustrated in FIG. 1, the base station 10 transmits a control signal or data to the terminal 20 by DL (Downlink) and receives a control signal or data by UL (Uplink) from the terminal 20. Both the base station 10 and the terminal 20 are capable of beam forming to transmit and receive signals. Both the base station 10 and the terminal 20 may also apply MIMO (Multiple Input Multiple Output) communications to the DL or UL. Both the base station 10 and the terminal 20 may also communicate via a CA (Carrier Aggregation) via a SCell (Secondary Cell) and a PC (Primary Cell).

The terminal 20 is a communication device with a wireless communication function, such as a smartphone, cellular phone, tablet, wearable terminal, and a communication module for M2M (Machine-to-Machine). As illustrated in FIG. 1, the terminal 20 utilizes various communication services provided by a wireless communication system by receiving control signals or data at DL from the base station 10 and transmitting control signals or data at UL to the base station 10. The terminal 20 may also have a function as a client application that communicates with an application server disposed in the network.

Figure 2:
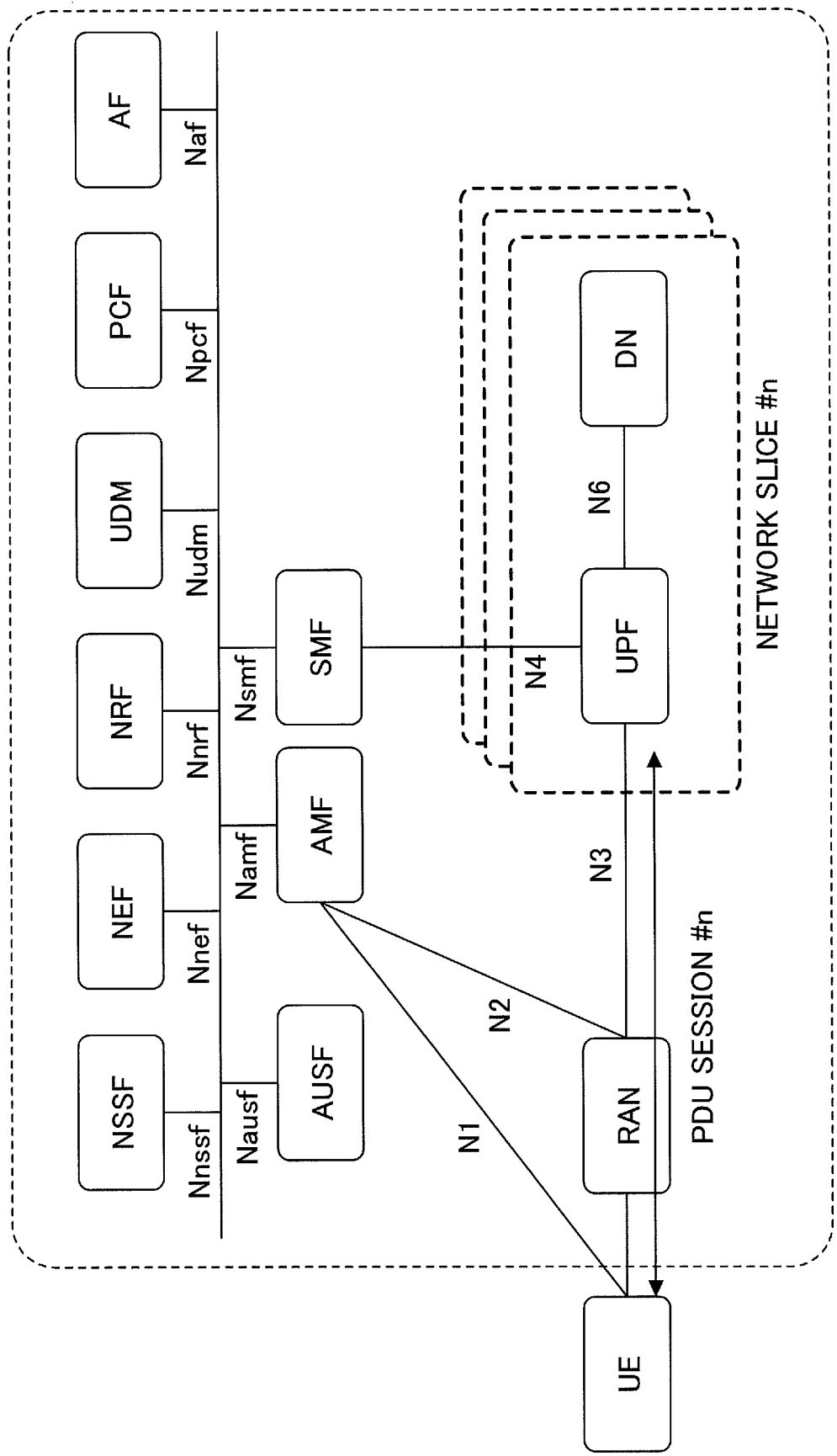
FIG. 2 is a view illustrating a core network according to an embodiment of the present invention.

FIG. 2 is a diagram illustrating a core network according to an embodiment of the present invention. As illustrated in FIG. 2, a system comprising a core network according to an embodiment of the present invention comprises a UE which is terminal 20 and a plurality of network nodes. The core network 30 in an embodiment of the present invention may correspond to one or more network nodes illustrated in FIG. 2. The core network 30 in an embodiment of the present invention may correspond to one or more network nodes illustrated in FIG. 2. Hereinafter, one network node corresponds to each function, but multiple functions may be realized by one network node or multiple network nodes may realize one function. Also, the "connection" described below may be a logical connection or a physical connection.

RAN (Radio Access Network) is a network node with wireless access functions connected to UE, AMF (Access and Mobility Management Function) and UPF (User plane function). The base station 10 may be a network node corresponding to the RAN. AMF is a network node having functions such as termination of a RAN interface, termination of a NAS (Non-Access Stratum), registration management, connection management, reachability management, and mobility management. UPF is a network node with functions such as a PDU (Protocol Data Unit) session point for external interconnection with DN (Data Network), packet routing and forwarding, and QoS (Quality of Service) handling on the user plane. UPF and DN comprise network slices. In the wireless communication network according to an embodiment of the present invention, a plurality of network slices is constructed.

AMF is connected to UE, RAN, SMF (Session Management Function), NSSF (Network Slice Selection Function), NEF (Network Exposure Function), NRF (Network Repository Function), UDM (Unified Data Management), AUSF (Authentication Server Function), PCF (Policy Control Function), and AF (Application Function). AMF, SMF, NSSF, NEF, NRF, AUSF, PCF, and AF are interconnected network nodes via their respective service-based interfaces, Namf, Nsmf, Nnssf, Nnef, Nnrf, Nudm, Nausf, Npcf, and Naf.

SMF is a network node having functions such as session management, Internet Protocol (IP) address assignment and management of UE, DHCP (DHCP) function, Address Resolution Protocol (ARP) proxy, and roaming function. NEF is a network node that has the capability to indicate, to other NFs (Network Functions), events and capabilities. NSSF is a network node that has functions such as selecting the network slice to which the UE connects, determining the allowed NSSAI (Network Slice Selection Assistance Information), determining the NSSAI to be set, and determining the AMF set to which the UE connects. The PCF is a network node having a function for controlling the policy of the network. AF is a network node that has the function of controlling an application server. NRF is a network node that has the function of discovering NF instances that provide services.

There is a growing demand for line services that enable users to control network quality requirements on demand, as does the network infrastructure provided by NaaS (Network as a Service). In wired networks, NaaS-like services are already provided. In view of the introduction of 5GC in wireless networks and the support of wireless functions such as URLLC (Ultra Reliable Low Latency Communications), NaaS may be provided by 5G wireless access.

In NaaS via 5G wireless access, if a user assumes on-demand changes to network quality requirements, the user may set network quality requirements through an application or web portal before communication is initiated. For example, if the network requires communication to which QoS (Quality of Service) is applied by a user, one implementation method may be to indicate, to the user, the communication quality that may be available, and determine the communication quality based on feedback from the user to provide communication.

However, the above-described method provides the user with the maximum communication quality that the network can provide. Since the resources held by the network are finite, it is desirable to specify a communication method that provides the minimum required communication quality for each user.

For example, a method of indicating, to a user, the communication quality that may be available from the network side, feeding back the desired communication quality to the network side based on the communication quality, and determining the communication quality that is provided to the user based on the feedback may be considered.

However, it is assumed that the indicators of communication quality cannot be set independently and correlate with each other. For example, when a low throughput is required, and when the encoding ratio is lowered, reliability, which is another indicator, improves. Therefore, it is difficult for a user to determine whether the desired communication quality can be provided even if information to set the communication quality is acquired from the network. Accordingly, it is desirable for the network to determine the communication quality that may be available by the network to a user.

Accordingly, a communication device and a communication method that provide communication to which network quality control determined by the network is applied in accordance with a request from a user in a wireless network will be described below.

(Functional Configuration)

Functional configuration examples of the terminal 20, the core network 30, and the QoS control web portal 40 according to an embodiment of the present invention will be described. The terminal 20, core network 30, and QoS control web portal 40 have functions to implement the embodiments described below. However, the terminal 20, the core network 30 and the QoS control web portal 40 may each include only some of the functions in the embodiment.

Figure 3:
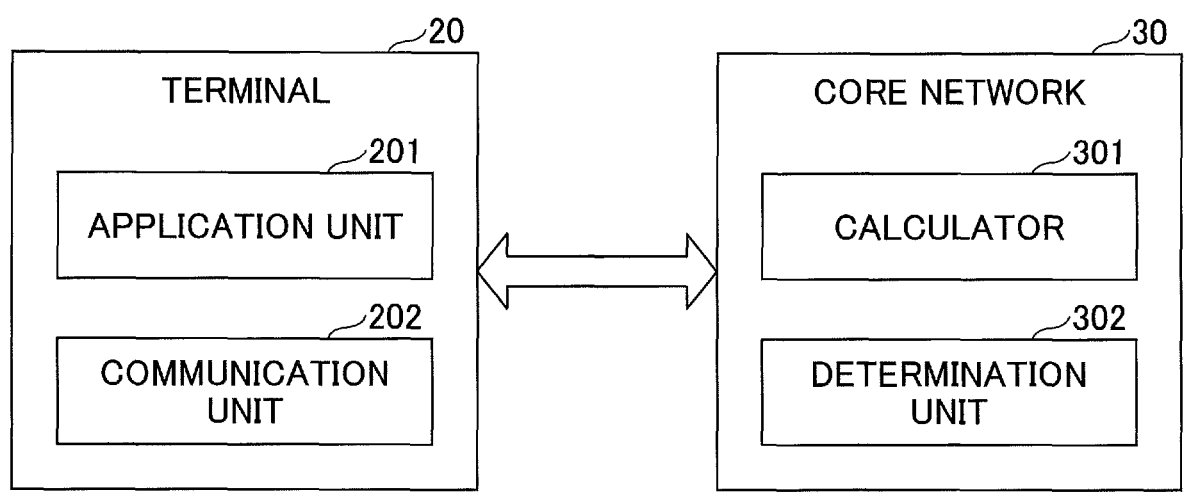
FIG. 3 is a diagram illustrating an example (1) of a functional configuration of a system according to an embodiment of the present invention.

FIG. 3 is a diagram illustrating an example (1) of a functional configuration of a system according to an embodiment of the present invention. As illustrated in FIG. 3, the terminal 20 is connected to the core network 30 to transmit and receive information. The terminal 20 includes an application unit 201 and a communication unit 202. The core network 30 includes a calculator 301 and a determination unit 302. The terminal 20 and the core network 30 may be capable of communicating via the base station 10. The functional configuration illustrated in FIG. 3 is only one example. If the operation according to the embodiments of the present invention may be performed, the functional category and the name of the functional unit may be any functional category and name.

The application unit 201 has functions pertaining to applications that require network quality control. The application unit 201 has a function to indicate, to the communication unit 202, the requested network quality requirements and to indicate, to the communication unit 202, the acceptable network quality requirements in response to inquiries from the communication unit 202.

Network quality requirements are parameters related to network quality control, such as parameters related to RTT (Round trip time) with the server or the latency such as user plane latency, jitter, reliability (e.g., ratio of packets satisfying the conditions among all packets), uplink data rate, and downlink data rate.

The communication unit 202 transmits a request based on a network quality requirement obtained from the application unit 201 and the location information of the terminal 20 to the core network 30. The communication unit 202 indicates, to the application unit 201, a determination result based on the determination result pertaining to the network quality requirement received from the core network 30. The communication unit 202 performs communication in which the network quality control is applied based on the determination result.

The network quality control at the network side may be performed by a base station 10 (e.g., eNB or gNB) that controls wireless resources, or a core network 30 (e.g., EPC or network node included in 5GC) that controls QCI (QoS Class Identifier).

The calculator 301 calculates the available network quality requirements based on the location information of the terminal 20 and indicates, to the determination unit 302, the available network quality requirements.

The determination unit 302 compares the network quality requirements received from the terminal 20 with the available network quality requirements indicated by the calculator 301 and determines a determination result and transmits the determination result to the terminal 20. That is, the determination unit 302 has a reception function and a transmission function. Details of the operation related to the determination will be described later.

Figure 4:
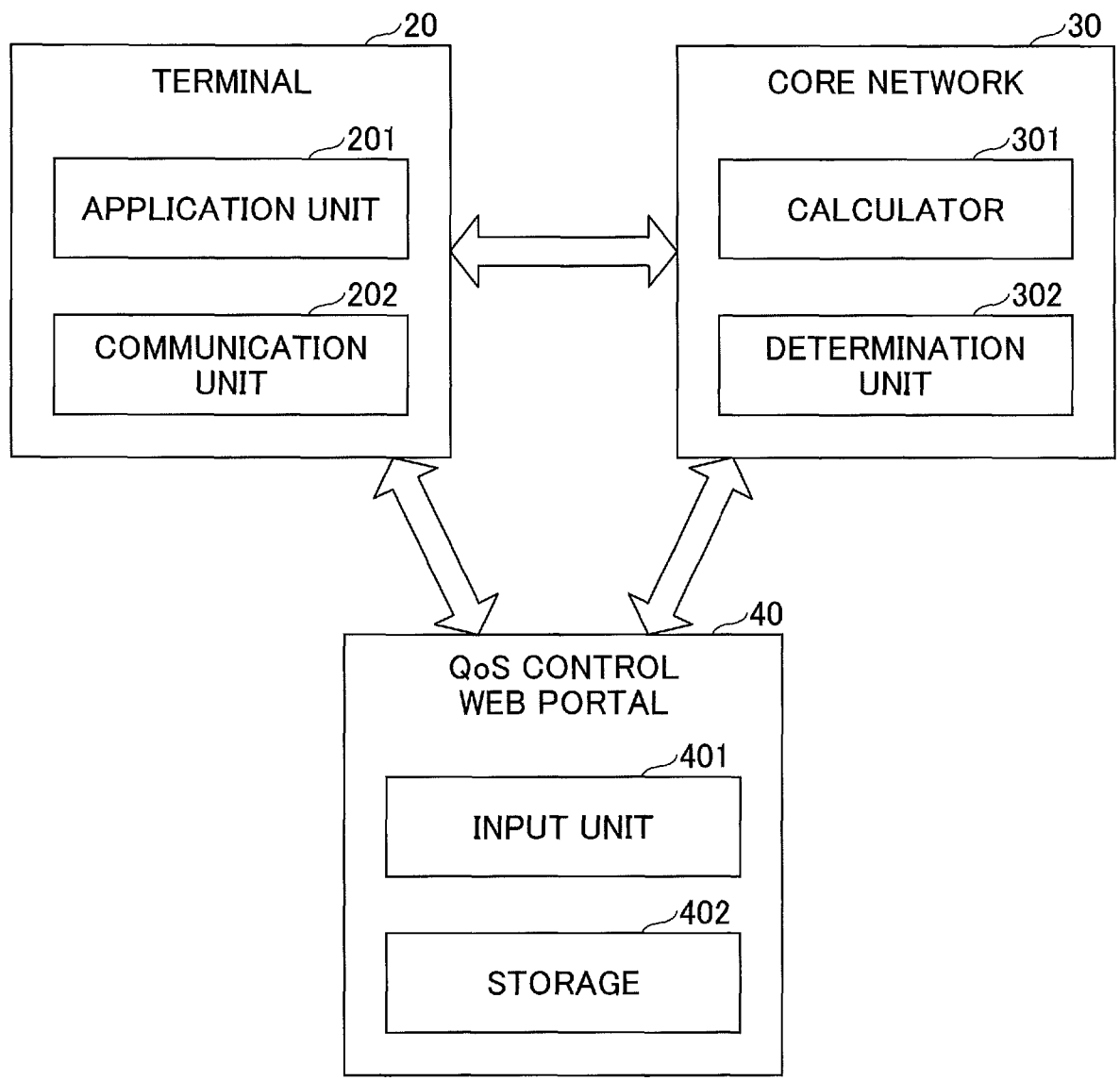
FIG. 4 is a diagram illustrating an example (2) of a functional configuration of a system according to an embodiment of the present invention.

FIG. 4 is a diagram illustrating an example (2) of a functional configuration of a system according to an embodiment of the present invention. The system illustrated in FIG. 4 is configured to include a QoS control web portal 40 in addition to the terminal 20 and the core network 30. The terminal 20 and the core network 30 are similar to those illustrated in FIG. 3. As illustrated in FIG. 4, the terminal 20, the core network 30, and the QoS control web portal 40 are connected to each other to transmit and receive information.

The QoS control web portal 40 includes an input unit 401 and a storage unit 402. The QoS control Web portal 40 may be controlled, for example, by a content provider or the like.

Input unit 401 can set the network quality requirements on an application-by-application or Uniform Resource Locator (URL) basis. The set network quality requirement is recorded in the storage unit 402. The input unit 401 transmits the set network quality requirement to the terminal 20 and shares the set network quality with the application unit 201 of the terminal 20. The input unit 401 may transmit the set network quality requirements and the request for the network quality requirements transmitted from the communication unit 202 simultaneously to the core network 30.

(Hardware Configuration)

Block diagrams (FIGS. 3 and 4) used in the description of the above embodiments illustrate blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (e.g., using wired, wireless, etc.) and implemented using these multiple devices. The functional block may be implemented by combining software with the device or devices.

Functions include, but are not limited to, judgment, determination, determination, calculation, calculation, processing, derivation, research, search, verification, reception, transmission, output, access, resolution, selection, selection, establishment, comparison, assumption, expectation, and deeming; broadcasting, notifying, communicating, forwarding, configuring, reconfiguring, allocating, mapping, and assigning. For example, a functional block (component) for functioning transmission is called a transmitting unit or a transmitter. In either case, as described above, the realization method is not particularly limited.

Figure 5:
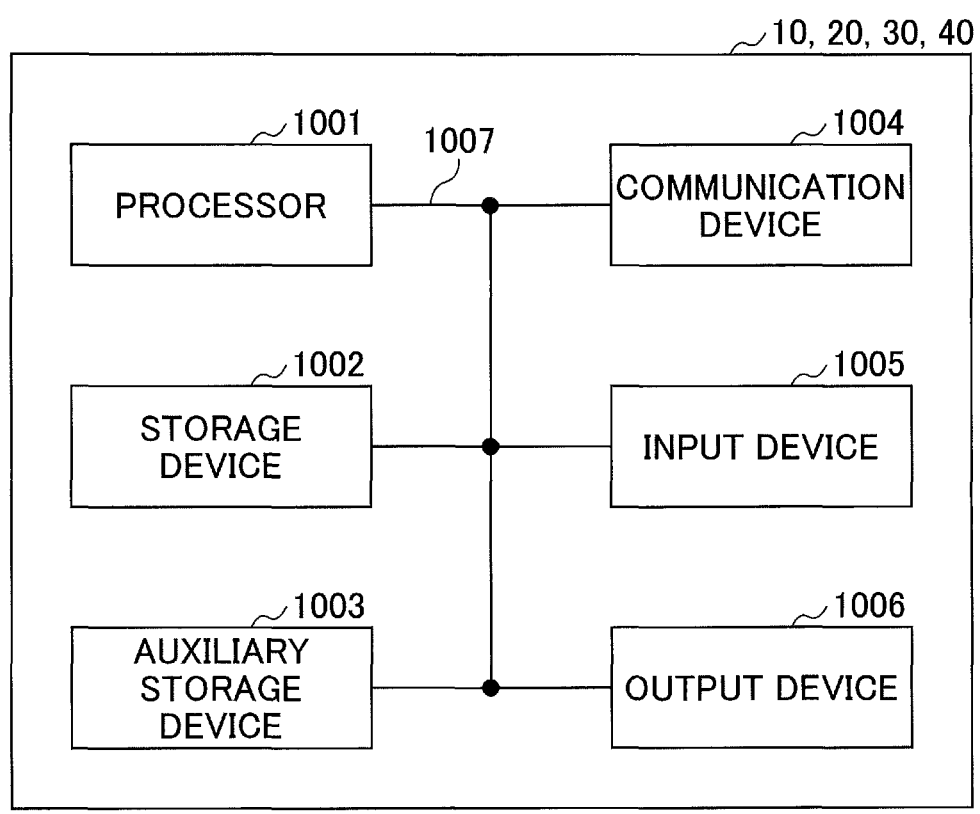
FIG. 5 is a diagram illustrating an example of a hardware configuration of a device according to an embodiment of the present invention.

For example, the network node, terminal 20, or the like according to an embodiment of the present disclosure may function as a computer for processing the wireless communication method of the present disclosure. FIG. 5 is a diagram illustrating an example of a hardware configuration of a device according to an embodiment of the present invention. The terminal 20, core network 30, and QoS control web portal 40 may be configured as a computer device including, physically, a processor 1001, storage device 1002, auxiliary storage device 1003, communication device 1004, input device 1005, output device 1006, bus 1007, and the like.

In the following description, the term "apparatus" may be read as circuits, devices, units, etc. The hardware configuration of the network node and terminal 20 may be configured to include one or more of the devices illustrated in the figure or may be configured without some of the devices.

Each function in the network node and the terminal 20 is realized by performing an operation by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be comprised of a central processing unit (CPU) including an interface with peripheral devices, a controller, a calculator, a register, and the like. For example, the application unit 201, the communication unit 202, the calculator 301, and the determination unit 302 may be implemented by the processor 1001.

The processor 1001 reads out a program (program code), software module, data, or the like from at least one of the auxiliary storage device 1003 and the communication device 1004 to the storage device 1002 and performs various processing in accordance with the above program. As a program, a program that causes a computer to execute at least a part of the operation described in the above-described embodiment is used. For example, the application unit 201 or the communication unit 202 of the terminal 20 illustrated in FIG. 3 may be stored in the storage device 1002 and implemented by a control program operating in the processor 1001. For example, the calculator 301 or the determination unit 302 of the core network 30 illustrated in FIG. 3 may be stored in the storage device 1002 and implemented by a control program operating in the processor 1001. For example, the input unit 401 of the QoS control web portal 40 illustrated in FIG. 4 may be stored in the storage device 1002 and implemented by a control program operating in the processor 1001. Although the foregoing processes have been described and executed by one processor 1001, they may be executed simultaneously or sequentially by two or more processors 1001. The processor 1001 may be implemented by one or more chips. The program may be transmitted from the network via a telecommunication line.

The storage device 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (main memory), or the like. The storage device 1002 can store programs (program codes), software modules, etc., executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a key drive), a floppy disk, a magnetic strip, and the like. The storage medium described above may be, for example, a database, a server, or other suitable medium that includes at least one of a storage device 1002 and an auxiliary storage device 1003. For example, the storage section 402 of the QoS control web portal 40 illustrated in FIG. 4 may be implemented by a storage device 1002 or an auxiliary storage device 1003.

The communication device 1004 is hardware (transmitting/receiving device) for performing communication between computers via at least one of a wired network and a wireless network, and is also referred to as a network device, a network controller, a network card, a communication module, or the like. The communication device 1004 may comprise a high frequency switch, duplexer, filter, frequency synthesizer, or the like, for example, to implement at least one of a frequency division duplex and a time division duplex. For example, the transmitting/receiving antenna, the amplifier unit, the transmitting/receiving unit, the transmission line interface, and the like may be implemented by the communication device 1004. The transmitting/receiving unit may be physically or logically isolated implementations of the transmitter and receiver. For example, the communication function of the communication unit 202 of the terminal 20 illustrated in FIG. 3, the determination unit 302 of the core network 30, and the input unit 401 of the QoS control web portal 40 illustrated in FIG. 4 may be implemented by the communication device 1004.

The input device 1005 is an input device (e.g., a keyboard, mouse, microphone, switch, button, sensor, etc.) that receives an external input. The output device 1006 is an output device (e.g., a display, speaker, LED lamp, etc.) that implements an external output. The input device 1005 and the output device 1006 may have an integral configuration (for example, a touch panel).

Respective devices, such as processor 1001 and storage device 1002, are connected by a bus 1007 for communicating information. The bus 1007 may be constructed using a single bus or may be constructed using different buses between devices.

The network node and terminal 20 may also comprise hardware, such as a microprocessor, a digital signal processor (DSP), an ASIC (Application Specific Integrated Circuit), a PLD (Programmable Logic Device), and an FPGA (Field Programmable Gate Array), by which some or all of the function blocks may be realized. For example, processor 1001 may be implemented using at least one of these pieces of hardware.

EXAMPLES

Figure 6:
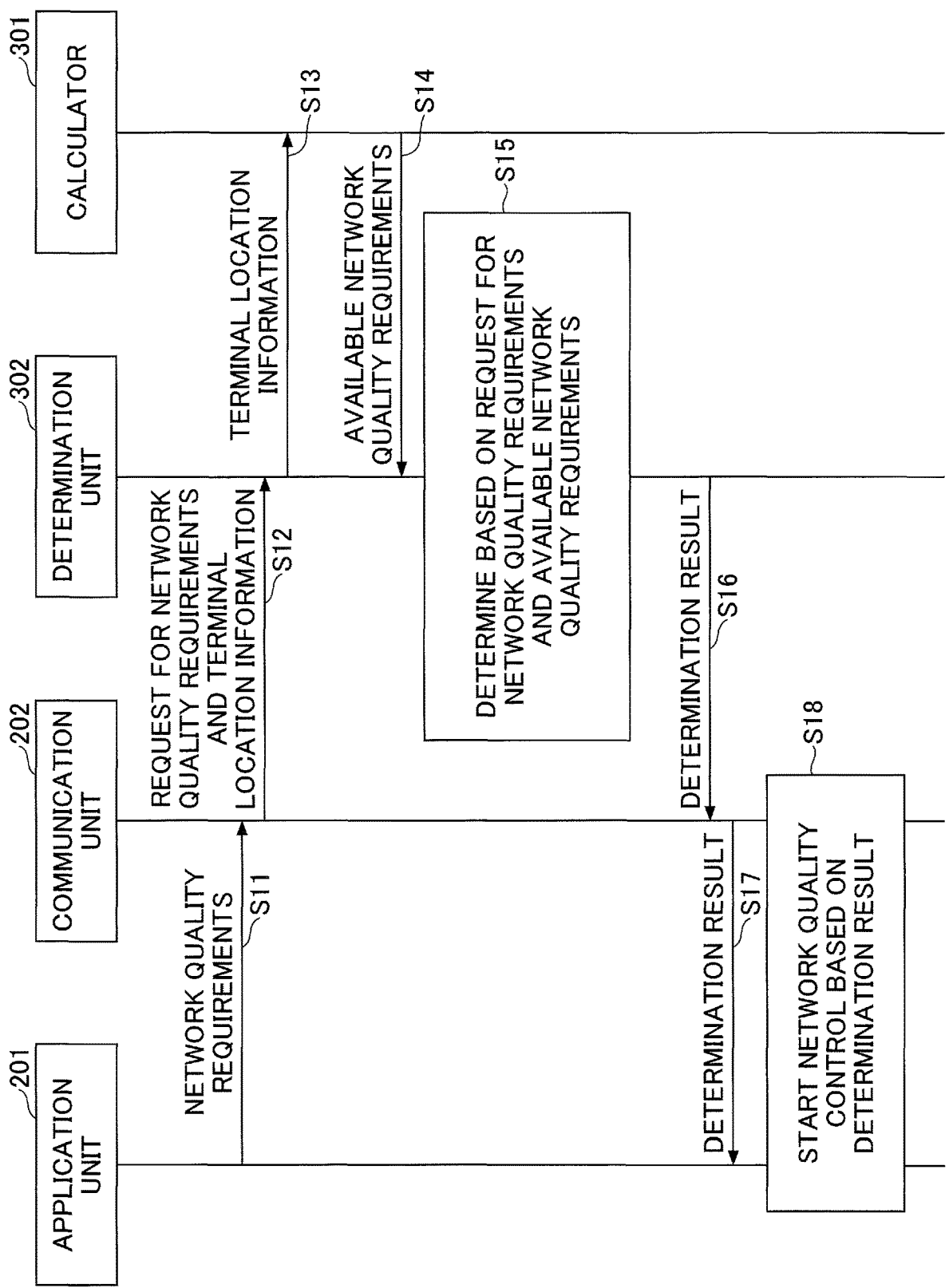
FIG. 6 is a sequence diagram illustrating an example (1) of control pertaining to network quality according to an embodiment of the present invention.

The terminal 20 may inform the core network 30 of multiple items of network quality requirements, and the core network 30 may determine the quality that may be available. FIG. 6 is a sequence diagram illustrating an example (1) of control pertaining to network quality according to an embodiment of the present invention.

In step S11, the application unit 201 may indicate, to the communication unit 202, priority and corresponding values on a per network quality requirement basis. Table 1 illustrates examples of priorities on a per network quality requirement basis.

TABLE 1

| NW QUALITY REQUIREMENT ITEMS | FIRST PRIORITY | SECOND PRIORITY | THIRD PRIORITY |
|---|---|---|---|
| USER PLANE LATENCY | 25 ms | 50 ms | 75 ms |
| JITTER | 10 ms | 30 ms | 100 ms |
| UPLINK DATA RATE | 500 Mbps | 200 Mbps | 100 Mbps |
| DOWNLINK DATA RATE | 750 Mbps | 500 Mbps | 300 Mbps |

As illustrated in Table 1, a first priority value, a second priority value, and a third priority value are set to each of the user plane latency, jitter, uplink data rate, and downlink data rate, which are the network quality requirement items. Note that the network quality requirement items are examples and may be other items. A different number of candidates may be set on a per network quality requirement item basis. For example, the user plane latency may include settings from the first priority to the fourth priority, and jitter may include settings from the first priority to the second priority. The first priority value, the second priority value, and the third priority value may be an index or identifier that uniquely identifies the corresponding numerical value in the determination unit 302 of the core network 30 rather than the numerical value itself.

In step S11, the application unit 201 may indicate, to the communication unit 202, that, for example, the QoS control or the priority control is requested with respect to the user plane latency without including a specific value. The communication unit 202 that receives the indication may set one specific value that is the first priority as the network quality requirement with respect to the user plane latency.

In step S12, the communication unit 202 transmits a request for the network quality requirement and the terminal location information to the determination unit 302. The request for the network quality requirement may be, for example, information illustrated in Table 1, i.e., item-specific priorities and corresponding values for network quality requirements. Table 2 illustrates an example of terminal location information.

TABLE 2

| LOCATION INFORMATION | (LATITUDE: 139° 44'28" 8759 EAST, LONGITUDE: 35° 39'29" 1572 NORTH) |
|---|---|

Geographical location information representing the longitude and latitude where the terminal 20 illustrated in Table 2 is located may be indicated to the determination unit 302. For example, the location information of the terminal 20 may be information by GNSS (Global Navigation Satellite System) or may include information indicative of height or altitude. If the core network 30 is location information capable of determining the available network quality requirements at the location of the terminal 20, the core network 30 may be of any kind.

The geographical location information indicated to the determination unit 302 may be the geographical location information calculated by using the network function such as the base station 10. The geographical location information of the terminal 20 is not limited to that indicated by the terminal 20 to the determination unit 302. The determination unit 302 may use the geographical location information of the terminal 20 acquired on the network side.

In step S13, the determination unit 302 transmits the terminal location information to the calculator 301. Subsequently, the calculator 301 determines the available network quality requirements, for example, as illustrated in Table 3, based on the terminal location information.

TABLE 3

| NW QUALITY REQUIREMENT ITEMS | AVAILABLE VALUES |
|---|---|
| USER PLANE LATENCY (U-PLANE LATENCY) | 20 ms |

TABLE 3-continued

| NW QUALITY REQUIREMENT ITEMS | AVAILABLE VALUES |
|---|---|
| JITTER | 40 ms |
| UPLINK DATA RATE | 300 Mbps |
| DOWNLINK DATA RATE | 450 Mbps |

As illustrated in Table 3, the calculator 301 determines values that may be available on a per network quality requirement item basis. The network quality requirement items that determine the available values may be predefined or indicated by the determination unit 302. The method of determining available network quality requirement items is not limited. For example, the determination may be based on a database in which network quality requirements corresponding to the location information have been recorded in advance, or it may be based on an operation using the state of the core network. In step S14, the calculator 301 transmits the available network quality requirements to the determination unit 302.

In Step S11, when the application unit 201 indicates, to the communication unit 202, that the QoS control or the priority control is requested without including the specific request value or including the specific request value, the calculator 301 may determine network quality requirements with the first priority as available network quality requirements provided that the number of persons or the amount of traffic per base station or cell does not exceed the specific value.

In Step S11, when the application unit 201 indicated, to the communication unit 202, that the QoS control or the priority control is requested without including the specific request value or including the specific request value, the calculator 301 may determine network quality requirements with the first priority as available network quality requirements provided that no special circumstances such as a disaster occurs, including a situation where an emergency call is received.

In Step S11, when the application unit 201 indicates, to the communication unit 202, that the QoS control or the priority control is requested with respect to the user plane latency without including or including the specific request value, the calculator 301 may determine network quality requirements with the first priority as available network quality requirements provided that the network device including the base station is not faulty.

In Step S15, the determination unit 302 makes determination based on the request for the network quality requirements received in Step S12 and the available network quality requirements received in Step S14. Table 4 is an example of the determination result when the network quality requirements are those in Table 1 and the available network quality requirements are those in Table 3.

TABLE 4

| NW QUALITY REQUIREMENT ITEMS | ACCEPTABLE REQUESTS |
|---|---|
| USER PLANE LATENCY (U-PLANE LATENCY) | FIRST PRIORITY |
| JITTER | THIRD PRIORITY |
| UPLINK DATA RATE | SECOND PRIORITY |
| DOWNLINK DATA RATE | THIRD PRIORITY |

The determination unit 302 determines whether the available values meet the values corresponding to those priorities in order of priority on a per network quality requirement item basis. If the available values satisfy the values corresponding to the priorities, then the priority of the acceptable request is determined. If the available value does not meet the value corresponding to any of the priorities, then the network quality requirement item is determined to be "unacceptable".

For example, since the user plane latency has a value corresponding to the first priority of 25 ms and a value corresponding to the available value of 20 ms, the determination unit 302 determines a "first priority" as an acceptable request, as illustrated in Table 4. For example, since the jitter has a value corresponding to the second priority of 30 ms, a value corresponding to the third priority of 40 ms, and a value corresponding to the third priority of 100 ms, the determination unit 302 determines a "third priority" as an acceptable request as illustrated in Table 4. For example, since the uplink data rate has a value corresponding to the first priority of 500 Mbps, a value corresponding to the second priority of 300 Mbps, and a value corresponding to the second priority of 200 Mbps, the determination unit 302 determines the "second priority" as an acceptable request as illustrated in Table 4. For example, since the value corresponding to the second priority is 500 Mbps, the value corresponding to the third priority is 450 Mbps, and the value corresponding to the third priority is 300 Mbps, the determination unit 302 determines the third priority as an acceptable request as illustrated in Table 4.

In Step S11, when the application unit 201 indicates, to the communication unit 202, that the QoS control or the priority control is requested without including a specific request value, the determination unit 302 may output a determination result indicating whether the first priority is satisfied on a per network quality requirement item basis.

In Step S16, the determination unit 302 transmits the determination result illustrated in Table 4 to the communication unit 202. Subsequently, the communication unit 202 transmits the determination result to the application unit 201 (S17). In step S18, when none of the items of the network quality requirement requested in the determination result is "unacceptable", the application unit 201 and the communication unit 202 start the network quality control. On the other hand, when at least one of the items of the network quality requirement requested in the determination result is "unacceptable", the communication unit 202 does not perform the network quality control.

As described in the above example, the priority order and the corresponding value are indicated by the terminal 20 to the core network 30, but it is not necessary to explicitly transmit the priority order from the terminal 20. A plurality of candidates may be indicated ty the terminal 20 to the core network 30 and returned according to specific rules as to which candidates are acceptable or unacceptable. For example, when sent from the terminal 20, each of a plurality of candidates may be assigned an identifier, and the identifier may be used as a criterion for which candidate is to be adopted on the core network 30 side.

As described above, network quality control may be performed with network quality requested by the terminal 20 on a per network quality requirement item basis.

As another example, in step S11, the application unit 201 may set a plurality of sets of network quality requirements and indicate them to the communication unit 202. Table 5 illustrates an example in which three sets of network quality requirements are set. The set of network quality requirements may be set to one or two, or four or more.

TABLE 5

| NW QUALITY REQUIREMENT ITEMS | HIGH | MIDDLE | LOW |
|---|---|---|---|
| USER PLANE LATENCY | 25 ms | 50 ms | 75 ms |
| JITTER | 10 ms | 30 ms | 100 ms |
| UPLINK DATA RATE | 500 Mbps | 200 Mbps | 100 Mbps |
| DOWNLINK DATA RATE | 750 Mbps | 500 Mbps | 300 Mbps |

As illustrated in Table 5, for example, a set of network quality requirements may be provided with a priority order of "High", "Middle", and "Low". When the request for the network quality requirements includes network quality requirements illustrated in Table 5, the determination unit 302 determines whether available values satisfy all the values of the set of items of the network quality requirements in the order of "High", "Middle", and "Low", in Step S15. When the available values satisfy all the values of the set, the available values are determined to be an acceptable set. When the available values do not satisfy at least one of the values of the set, the set of items will be considered unacceptable. When the available values are unacceptable in either set, then the network quality requirement items are determined to be "unacceptable".

For example, when the network quality requirement items are those in Table 5 and the available network quality requirement items are those in Table 3, then the set "High" is determined to be unacceptable because jitter, uplink data rate and downlink data rate exceed the available values. The set "Middle" is determined to be unacceptable because the jitter and the downlink data rate exceed the available values. On the other hand, the set "Low" is determined to be acceptable because all of the network quality requirement items are satisfied by the available values, and information indicating that set "Low" is acceptable as the determination result, may be indicated to the communication unit 202. When any set of "High", "Middle", or "Low" is unacceptable, the "unacceptable" may be indicated as the determination result to the communication unit 202.

In step S18, the application unit 201 and the communication unit 202 start the network quality control when the received determination result is acceptable to any set of network quality requirements. In contrast, the application unit 201 and the communication unit 202 do not perform network quality control when the received determination result is unacceptable to all the sets of network quality requirements.

As described above, by determining whether each set of network quality requirements is acceptable or unacceptable, signaling capacity can be reduced in a manner consistent with the discrete mode switching implementation, for example, high-quality mode or low-quality mode used in applications. When the network quality requirement items are requested individually, for example, when a higher requirement is available for a given item but there is another item that can only provide a lower requirement, then the higher requirement item cannot be fully utilized and the resource may be wasted. On the other hand, when a set of network quality requirement items is requested, each set meets the network quality requirement items used in the application, thus making full use of the resources.

As another example, in step S11, the application unit 201 may set a plurality of sets of the network quality requirements for each value of the network key item and indicate them to the communication unit 202. Table 6 illustrates an example in which three sets of network quality requirements are set when the network key item is "Reliability". The number of sets specified by a network key entry may be set to one or two, or four or more. Reliability may be defined as the number of packets that meet the network quality requirements, or as the percentage of time space that meets the network quality requirements.

TABLE 6

| NW QUALITY REQUIREMENT ITEMS | RELIABILITY (LESS THAN 99%) | RELIABILITY (99% OR MORE AND LESS THAN 99.99%) | RELIABILITY (99.99% OR MORE) |
|---|---|---|---|
| USER PLANE LATENCY | 25 ms | 50 ms | 75 ms |
| JITTER | 10 ms | 30 ms | 100 ms |
| UPLINK DATA RATE | 500 Mbps | 200 Mbps | 100 Mbps |
| DOWNLINK DATA RATE | 750 Mbps | 500 Mbps | 300 Mbps |

Network key items may be used in the case where conditions or levels of other items are acceptable under relaxed conditions or at low levels, provided the "network key item" meets stringent conditions or standards. Conversely, if the "network key item" is loose or low, the conditions of other items may be stricter or the level of other items may be higher. For example, the set of reliability (>99.99%) in Table 6 is an acceptable example with a high latency and a low data rate if the reliability is high.

In addition to reliability, network key items may be changed by applications such as "whether D2D communication is possible", "user plane latency", or "uplink data rate", etc., and are not limited. The network key items may be dependent on other items. The network key item may consist of multiple items. For example, a network key item may be a set of three items: reliability, user plane latency, and uplink data rate.

Tables 7 and 8 are examples of available network quality requirements, and "Reliability" is included as an item of network quality requirements.

TABLE 7

| NW QUALITY REQUIREMENT ITEMS | AVAILABLE VALUES |
|---|---|
| RELIABILITY | 99.9% |
| USER PLANE LATENCY (U-PLANE LATENCY) | 20 ms |
| JITTER | 25 ms |
| UPLINK DATA RATE | 300 Mbps |
| DOWNLINK DATA RATE | 600 Mbps |

TABLE 8

| NW QUALITY REQUIREMENT ITEMS | AVAILABLE VALUES |
|---|---|
| RELIABILITY | 99.9% |
| USER PLANE LATENCY (U-PLANE LATENCY) | 20 ms |
| JITTER | 40 ms |
| UPLINK DATA RATE | 300 Mbps |
| DOWNLINK DATA RATE | 450 Mbps |

For example, the operation of step S15 will be described when the network quality requirements are those in Table 6 and the available network quality requirements are those in Table 7. Since the reliability of the available network key item is 99.9%, the determination unit 302 makes determination based on the request for the network quality requirements. The set of the available network quality requirements corresponds to "Reliability (less than 99%) and "Reliability (99% to less than 99.99%)" of the network key items. A set of network key items corresponding to "Reliability (99.99% or more)" is not determined because the reliability of the available network quality requirements exceeds 99.9%.

When comparing the requested network quality requirements having the "Reliability (<99%)" with the available network quality requirements, none of user plane latency, jitter, uplink data rate, and downlink data rate meets the request. On the other hand, when comparing the network quality requirements requested for "Reliability (99% to less than 99.991)" with the available network quality requirements, the user plane latency, jitter, uplink data rate, and downlink data rate all meet the requests. Therefore, the determination result is as illustrated in Table 9.

TABLE 9

| NW QUALITY REQUIREMENT ITEMS | RELIABILITY (LESS THAN 99%) | RELIABILITY (99% OR MORE AND LESS THAN 99.99%) | RELIABILITY (99.99% OR MORE) |
|---|---|---|---|
| USER PLANE LATENCY | NG | OK | — |
| JITTER | NG | OK | — |
| UPLINK DATA RATE | NG | OK | — |
| DOWNLINK DATA RATE | NG | OK | — |

As illustrated in Table 9, since reliability (less than 99%) is NG and reliability (not less than 99% but less than 99.99%) is OK, the reliability (not less than 99% but less than 99.99%) being acceptable is transmitted to the communication unit 202 as a determination result, and network quality control is started.

For example, an operation of step S15 will be described when the request for the network quality requirements includes network quality requirements in Table 6 and the available network quality requirements are those in Table 8. Since the reliability of the available network key item is 99.9%, the determination unit 302 makes determination based on the request for the network quality requirements. The set of the available network quality requirements corresponds to "Reliability (less than 99%) and "Reliability (99% to less than 99.99%)" of the network key item. A set of network key items corresponding to "Reliability (99.99% or more)" is not determined because the reliability of the available network quality requirements exceeds 99.9%.

When comparing the requested network quality requirements having the "Reliability (<99%)" with the available network quality requirements, none of user plane latency, jitter, uplink data rate, and downlink data rate meets the requests. On the other hand, when comparing the requested network quality requirements having the "Reliability (99% to less than 99.99%)" with the available network quality requirements, the user plane latency and uplink data rate meet the requests, but the jitter and downlink data rate do not meet the requests. Thus, the determination results are as illustrated in Table 10.

TABLE 10

| NW QUALITY REQUIREMENT ITEMS | RELIABILITY (LESS THAN 99%) | RELIABILITY (99% OR MORE AND LESS THAN 99.99%) | RELIABILITY (99.99% OR MORE) |
|---|---|---|---|
| USER PLANE LATENCY | NG | OK | — |
| JITTER | NG | NG | — |
| UPLINK DATA RATE | NG | OK | — |
| DOWNLINK DATA PATE | NG | NG | — |

As illustrated in Table 10, since reliability (less than 99%) is NG and reliability (99% or more but less than 99.99%) is NG, the requirements being unacceptable is transmitted to the communication unit 202 as a determination result of the that it is unacceptable, and the network quality control is not performed.

As noted above, by setting and requesting a set of network quality requirements for each value of a network key item, a more flexible NaaS service may be provided that is compatible with the application's use case.

As another example, in step S11, the application unit 201 may set a plurality of sets of the network quality requirements for each value of the network key item and indicate, to the communication unit 202, the set result. That is, Table 5 and Table 6 may be combined to provide network quality requirements. Table 11 illustrates the combined network quality requirements in Table 5 and Table 6.

TABLE 11

| NW QUALITY REQUIREMENT ITEMS | RELIABILITY (LESS THAN 99%) | | RELIABILITY (99% OR MORE AND LESS THAN 99.99%) | | RELIABILITY (99.99% OR MORE) | |
|---|---|---|---|---|---|---|
| PATTERN | HIGH | LOW | HIGH | LOW | HIGH | LOW |
| USER PLANE LATENCY (U-PLANE LATENCY) | 25 ms | 35 ms | 50 ms | 60 ms | 75 ms | 90 ms |
| JITTER | 10 ms | 20 ms | 30 ms | 50 ms | 100 ms | 120 ms |
| UPLINK DATA RATE | 500 Mbps | 300 Mbps | 200 Mbps | 150 Mbps | 100 Mbps | 50 Mbps |
| DOWNLINK DATA RATE | 750 Mbps | 500 Mbps | 500 Mbps | 400 Mbps | 300 Mbps | 200 Mbps |

For example, the operation of step S15 will be described when the network quality requirements are those in Table 11 and the available network quality requirements are those in Table 7. Since the reliability of the available network key item is 99.9%, the determination unit 302 makes determination based on the request for the network quality requirements. The set of the available network quality requirements corresponds to "Reliability (less than 99%) and "Reliability (99% to less than 99.99%)" of the network key item. A set of network key items corresponding to "Reliability (99.99% or more)" is not determined because the reliability of the available network quality requirements exceeds 99.9%.

Comparing the requested network quality requirements having the "Reliability" (less than 99%) and "High" with the available network quality requirements, neither user plane latency, jitter, uplink data rate, nor downlink data rate meets the requests. When comparing the requested network quality requirements having the "Reliability" (less than 99=) and "Low" with the available network quality requirements, the jitter and downlink data rates of those meeting the requirements are not met. Therefore, the determination result indicates that neither "High" nor "Low" is acceptable for "Reliability (<99%)".

When the requested network quality requirements having the "Reliability (99% to less than 99.99%) and "High" are compared to the available network quality requirements, the user plane latency, jitter, uplink data rate, and downlink data rate all meet the requests. Therefore, the determination results are acceptable for "Reliability (99% to less than 99.99%) and "High".

Figure 7:
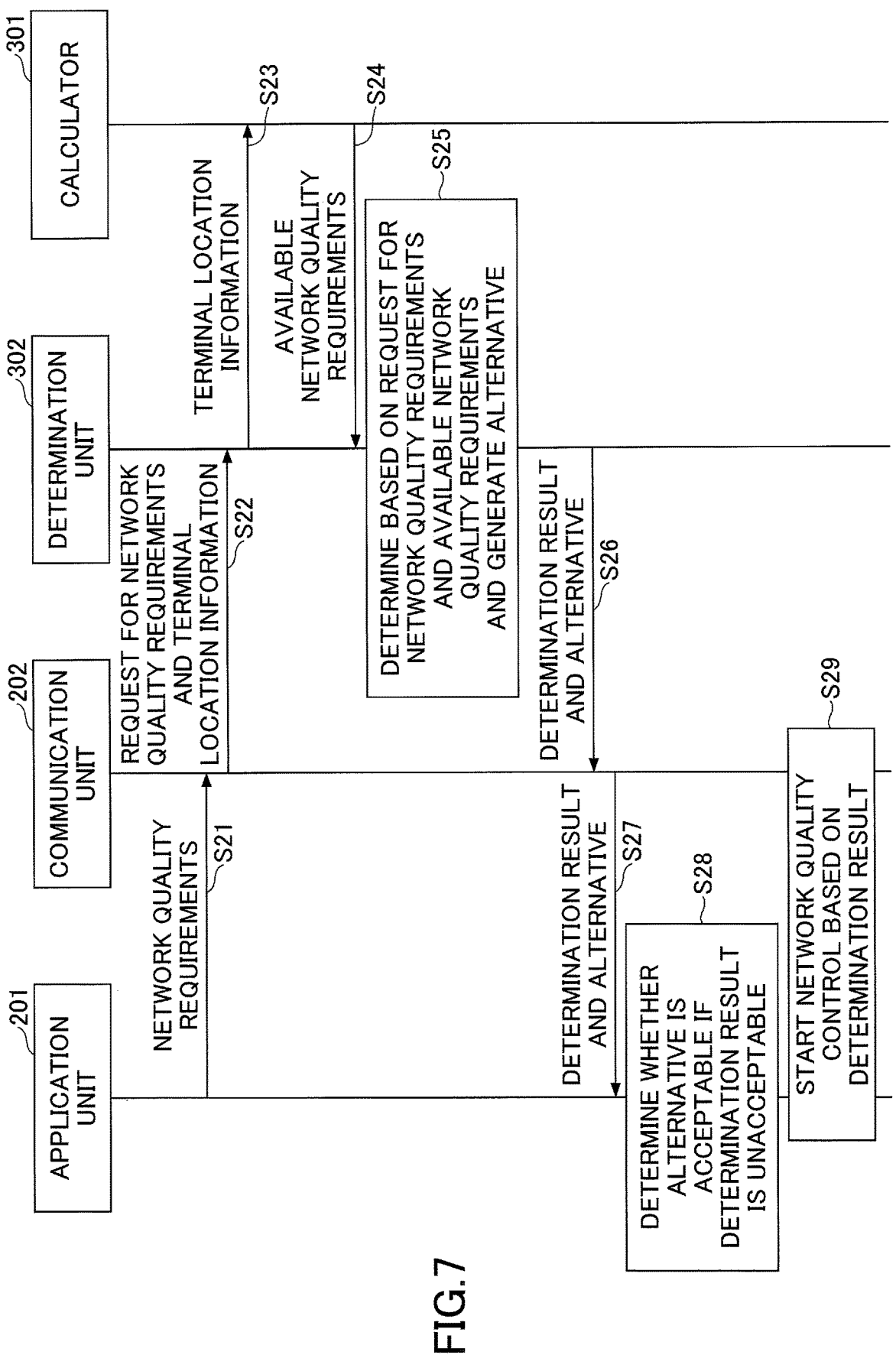
FIG. 7 is a sequence diagram illustrating an example (2) of control pertaining to network quality according to an embodiment of the present invention.

FIG. 7 is a sequence diagram illustrating an example (2) of control pertaining to network quality according to an embodiment of the present invention. If the determination result transmitted from the determination unit 302 to the communication unit 202 is unacceptable, an alternative may be added. Steps S21 through S24 illustrated in FIG. 7 are similar to Steps S11 through S14 illustrated in FIG. 6.

In step S25, the determination unit 302 makes determination based on the request for the network quality requirements received in step S22 and the network quality requirements received in step S24. Table 12 indicates examples of the network quality requirements.

TABLE 12

| NW QUALITY REQUIREMENT ITEMS | REQUESTS |
|---|---|
| USER PLANE LATENCY (U-PLANE LATENCY) | 25 ms |

TABLE 12-continued

| NW QUALITY REQUIREMENT ITEMS | REQUESTS |
|---|---|
| JITTER | 10 ms |
| UPLINK DATA RATE | 500 Mbps |
| DOWNLINK DATA RATE | 750 Mbps |

For example, when the network quality requirements are those in Table 12 and the available network quality requirements are those in Table 3, the user plane latency meets the request while jitter, uplink data rate, and downlink data rate do not meet the request. Therefore, the network quality requirement is determined to be unacceptable. Alternatively, alternatives to the network quality requirements, such as those illustrated in Table 13, may be generated.

TABLE 13

| NW QUALITY REQUIREMENT ITEMS | ALTERNATIVES |
|---|---|
| USER PLANE LATENCY (U-PLANE LATENCY) | 20 ms |
| JITTER | 40 ms |
| UPLINK DATA RATE | 300 Mbps |
| DOWNLINK DATA RATE | 450 Mbps |

Note that the alternatives illustrated in Table 13 are examples that are the same as the available network quality requirements, but the alternatives may differ from the available network quality requirements. Alternatively, when the network quality requirements are those illustrated in Table 5, the alternatives may be either "High", "Middle" or "Low". Alternatively, when the network quality requirements are those illustrated in Table 6, the alternatives may be a set corresponding to network key items. The alternative measure is not limited to one, and the plurality of alternatives may be transmitted from the determination unit 302 to the communication unit 202.

In step 526, the determination unit 302 transmits the determination result and alternatives to the communication unit 202 when the determination result is unacceptable. Subsequently, in S27, the communication unit 202 transmits the determination result and the alternatives to the application unit 201 when the determination result is unacceptable. In step S28, when the determination result is unacceptable, the application unit 201 determines whether the alternatives are acceptable.

In step S29, the application unit 201 and the communication unit 202 start network quality control when the determination result transmitted from the determination unit 302 is acceptable or when the alternatives are acceptable. Meanwhile, the application unit 201 and the communication unit 202 do not perform network quality control when the alternatives are unacceptable.

As noted above, when the network quality requirements are unacceptable, the core network 30 may respond to the terminal 20 with alternatives to increase the likelihood that the application will immediately initiate network quality control.

According to the above-described embodiment, network quality control may be performed based on network quality calculated from the location information of the terminal 20 and network quality requested by the terminal 20. On a per network quality requirement item basis, network quality control may be performed with network quality requested by the terminal 20. Also, by determining whether a set of network quality requirements is acceptable or unacceptable, signaling capacity may be reduced. In addition, when a set of network quality requirements items is requested, resources may be fully utilized because each set conforms to items of the network quality requirements used in the application. In addition, by setting and requesting a set of network quality requirements for each value of a network key item, a more flexible NaaS service may be provided that is compatible with the application's use case. Also, if the network quality requirements are unacceptable, the core network 30 may respond to the terminal 20 with alternatives to increase the likelihood that the application will immediately initiate network quality control.

In other words, it is possible to provide communication in which QoS (Quality of Service) is applied in the wireless network according to the request for the terminal.

(Summary of Embodiments)

As described above, according to an embodiment of the present invention, a communication device capable of communicating with a terminal performing wireless communication, the communication device including a receiver that receives a request for a network quality requirement from the terminal, a calculator that calculates a network quality requirement that may be available to the terminal, a determination unit that compares the request for the available network quality requirement to determine whether the request is acceptable, and a receiver that transmits a result of the determination to the terminal is provided.

With the above-described configuration, the QoS control may be performed based on the network quality calculated from the location information of the terminal 20 and the network quality requested by the terminal 20. In other words, it is possible to provide communication in which QoS (Quality of Service) is applied in the wireless network according to the request for the terminal.

The request includes settings of a plurality of values for each of the items included in the network quality requirements, and the determination unit may determine, for each of the items, which of the plurality of values is acceptable and which is unacceptable. The configuration allows QoS control to be performed on a per network quality requirement item basis at the network quality requested by the terminal 20.

The request includes one or more sets containing values corresponding to each of the items included in the network quality requirements, wherein the determination unit is a result of the determination the set in which all of the items met the corresponding values of the available network quality requirements, and in which case the precedence may be set to each of the sets. With this configuration, and when a set of network quality requirement items is requested, each set can make full use of resources because it conforms to the network quality requirement items used in applications. Also, by determining whether a set of network quality requirements is acceptable or unacceptable, signaling capacity may be reduced.

The requirement may be directed to determining each item of a set defined by one or more of the items defining the set that includes a plurality of sets containing values corresponding to each of the items included in the network quality requirements, where the item or items defining the first set is lower than the item or items defining the second set, wherein items other than the item or items defining the first set are higher than items other than the item or items defining the second set, and wherein the determination unit determines each item of the set defined by the item or items defining the set that is lower than the item or items defining the set that satisfies the available network quality requirements. This configuration allows for more flexible NaaS services to be provided for the application's use case by setting and requesting a set of network quality requirements for each value of network key item.

The terminal according to claim 1, wherein the transmitter transmits an alternative network quality requirement to the terminal when the determination unit determines that the request is not acceptable. When the configuration makes the network quality requirement unacceptable, the core network 30 may respond to the terminal 20 with alternatives to increase the likelihood that the application will immediately initiate QoS control.

The receiver receives from the terminal the location information of the terminal, and the calculator may calculate network quality requirements available to the terminal based on the location information. With this configuration, the QoS control may be performed based on the network quality calculated from the location information of the terminal 20 and the network quality requested by the terminal 20.

Items included in the network quality requirements may include at least one of latency parameters, jitter, uplink data rates, and downlink data rates. The configuration allows QoS control to be performed on a per network quality requirement item basis at the network quality requested by the terminal 20.

Further, according to an embodiment of the present invention, a communication method is performed by a communication device capable of communicating with a terminal that performs wireless communication, wherein a communication method is provided which performs: a reception procedure for receiving a request for a network quality requirement pertaining to QoS (Quality of Service) and location information of the terminal from the terminal; an operation procedure for calculating available network quality requirements to the terminal based on said location information; a determination procedure for comparing the request for the available network quality requirement to determine whether the request is acceptable; and a transmission procedure for transmitting a result of said determination to the terminal.

With the above-described configuration, the QoS control may be performed based on the network quality calculated from the location information of the terminal 20 and the network quality requested by the terminal 20. In other words, it is possible to provide communication in which QoS (Quality of Service) is applied in the wireless network according to the request for the terminal.

(Supplement to Embodiments)

Thus, although embodiments of the present invention have been described, the disclosed invention is not limited to such embodiments, and various modifications, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For purposes of illustration, network nodes and terminals 20 have been described using a functional block diagram, but such devices may be implemented in hardware, software, or a combination thereof. Software operated by processors of network nodes in accordance with embodiments of the present invention and software operated by processors of terminals 20 in accordance with embodiments of the present invention may be stored in random access memory (RAM), flash memory, read-only memory (ROM), EPROM, EEPROM, register, hard disk (HDD), removable disk, CD-ROM, database, server, or any other suitable storage medium.

Information may also be communicated in other ways, as well as in the manner/embodiments described in this disclosure. For example, indication of information may be performed by physical layer signaling (e.g., DCI (Downlink Control Information), UCI (Uplink Control Information), upper layer signaling (e.g., RRC (Radio Resource Control) signaling, MAC (Medium Access Control) signaling, MIB (Master Information Block), SIB (System Information Block)), other signals, or a combination thereof. The RRC signaling may also be referred to as an RRC message, for example, RRC Connection Setup (RRC Connection Setup) message, RRC Connection Reconstruction (RRC Connection Reconstruction) message, or the like.

Each aspect/embodiment described in this disclosure is as follows: LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000 UMB (Ultra Mobile Broadband), IEEE 802.11 (Wi-Fi), IEEE 802.16 (WiMAX), IEEE 802.20 (Ultra-WideBand), Bluetooth (Registered), It may be applied to at least one of the systems utilizing other appropriate systems and the next generation systems extended thereon. Multiple systems may also be applied in combination (e.g., at least one of LTE and LTE-A combined with 5G, etc.).

The processing procedures, sequences, flowcharts, etc. of each aspect/embodiment described herein may be reordered unless there is any conflict. For example, the methods described in the present disclosure are presented using exemplary sequences to present elements of the various steps and are not limited to the particular order presented.

The specific operations described herein as performed by a network node may be performed by that upper node in some cases. In a network of one or more network nodes having network nodes, it will be apparent that various operations performed for communication with terminal 20 may be performed by at least one of network nodes and other network nodes other than network nodes (e.g., but not limited to MME, S-GW, etc.). Although the above illustrates that there is only one other network node other than the network node, the other network nodes may be a combination of multiple other network nodes (e.g., MME and S-GW).

The information or signals described in this disclosure may be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Software should be broadly interpreted to mean, whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared, microwave, etc.), at least one of these wireline technology and wireless technology is included within the definition of a transmission medium.

The information, signals and the like described in this disclosure may be represented using any of a variety of different technologies. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, or the like.

As used in this disclosure, the terms "system" and "network" are used interchangeably.

The information, parameters, and the like described in the present disclosure may also be expressed using absolute values, relative values from predetermined values, or they may be expressed using corresponding separate information. For example, the wireless resources may be those indicated by an index.

The name used for the parameters described above is not restrictive in any respect. In addition, the mathematical equations using these parameters may differ from those explicitly disclosed in this disclosure. Since the various channels (e.g., PUCCH, PDCCH, etc.) and information elements may be identified by any suitable name, the various names assigned to these various channels and information elements are not in any way limiting.

In this disclosure, terms such as "base station", "base station", "base station", "base station", "base station", "fixed station", "NodeB", "eNodeB", "gNodeB", "access point", "transmission point", "reception point", "transmission/reception point", "cell", "sector", "cell group", "carrier", "component carrier", and the like may be used interchangeably. The base station may also be referred to as a macrocell, a small cell, a femtocell, a picocell, or the like.

The base station can accommodate one or more (e.g., three) cells. If the base station accommodates a plurality of cells, the entire coverage area of the base station may be divided into a plurality of smaller areas, each of which can also provide communications services via a base station subsystem (e.g., a small indoor base station (RRH) or Remote Radio Head). The term "cell" or "sector" refers to part or all of the coverage area of at least one of the base station and base station subsystem that provides communications services at the coverage.

In this disclosure, terms such as "mobile station", "user terminal", "user equipment", "terminal", and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base stations and the mobile station may be referred to as a transmitter, receiver, communication device, or the like. At least one of the base station and the mobile station may be a device mounted on the mobile body, a mobile body, or the like. The mobile may be a vehicle (e.g., a car, an airplane, etc.), an unmanned mobile (e.g., a drone, an automated vehicle, etc.), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read by the user terminal. For example, various aspects/embodiments of the present disclosure may be applied for a configuration in which communication between base stations and user terminals is replaced by communication between multiple terminals 20 (e.g., may be referred to as D2D (Device-to-Device), V2X (Vehicle-to-Everything), etc.). In this case, the above-described network node may have a configuration in which the terminal 20 has a function. The phrases "uplink" and "downlink" may also be replaced by the phrases corresponding to terminal-to-terminal communication (e.g., "side"). For example, an uplink channel, an downlink channel, or the like may be read by a side channel.

Similarly, the user terminal in the present disclosure may be read by the base station. In this case, the base station may have the functions provided by the user terminal described above.

As used in this disclosure, the terms "determining" and "determining" may encompass a wide variety of operations. "Judgment" includes, for example, judging, calculating, computing, processing, deriving, investigating, looking up, searching, investigating (e.g., searching in tables, databases, or other data structures), ascertaining, and so forth. "Judgment" and "decision" may also include receiving (e.g., receiving information), transmitting (e.g., sending information), input, output, and accessing (e.g., accessing data in memory) as "judged" and "determined", and the like. "Judgment" and "decision" may also include "judgment" and "decision" regarding matters such as resolving, selecting, choosing, establishing, comparing, etc. That is, the "judgment" and the "decision" may include deeming some action to be "judgment" and "determination". "Decision" may be read as "Assuming", "Expected", or "Considering", etc.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "solely" unless otherwise specified. In other words, the expression "based on" means both "solely" and "at least based on".

Any reference to an element using a designation such as "first" or "second" as used in the present disclosure does not generally limit the amount or order of those elements. These designations may be used in the present disclosure as a convenient way to distinguish between two or more elements. Thus, references to the first and second elements do not imply that only two elements may be employed or that the first element must in some way precede the second element.

"Means" in the configuration of each of the above devices may be replaced by "parts", "circuits", "devices", etc.

When the terms "include", "including" and variations thereof are used in the present disclosure, these terms are intended to be comprehensive as well as the term "comprising". Moreover, the term "or" as used in this disclosure is not intended to be an exclusive-OR.

In the present disclosure, where an article is added by translation, for example a, an, and the English language, the disclosure may include that the noun following these articles is plural.

In this disclosure, the term "A and B are different" may mean "A and B are different from each other". Incidentally, the term may mean "A and B are different from C". Terms such as "separated" or "combined" may be interpreted as well as "different".

The aspects/embodiments described in this disclosure may be used alone, in combination, or switched with implementation. Notice of a given information (e.g. "X" notice) may also be given by implication (e.g. "no notice of the given information"), not explicitly.

The core network 30 of the present disclosure is an example of a communication device. The determination unit 302 is an example of a receiver or a receiver.

While the present disclosure has been described in detail above, those skilled in the art will appreciate that the present disclosure is not limited to the embodiments described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

This international patent application claims priority to Japanese Patent Application No. 2019-228325, filed on Dec. 18, 2019, and the entire contents of Japanese Patent Application No. 2019-228325 are hereby incorporated by reference.

EXPLANATION OF REFERENCE NUMERALS 10 base station
20 terminal
30 core network
40 QoS control web portal
201 application unit
202 communication unit
301 calculator
302 determination unit
401 input unit
402 storage device
1001 processor
1002 storage device
1003 auxiliary storage device
1004 communication device
1005 input device
1006 output device

The invention claimed is:

1. A communication device capable of communicating with a terminal that performs wireless communication, the communication device comprising:
   a receiver configured to receive a request for network quality requirements from the terminal;
   a processor configured to calculate network quality requirements available to the terminal, and to compare the request with the available network quality requirements to determine whether the request is acceptable; and
   a transmitter configured to transmit a result of the determination to the terminal,
   wherein the request includes a plurality of requirement sets, and each requirement set of the plurality of requirement sets is defined by a plurality of values corresponding to a respective plurality of parameters included in the network quality requirements, and
   wherein the processor is configured to determine each parameter of the plurality of parameters of one or more requirement sets from among the plurality of requirement sets, the one or more requirement sets being defined by the plurality of values whose levels are lower than respective levels of a plurality of values corresponding to the respective plurality of parameters that defines the available network quality requirements, as a target subject to determination.

2. The communication device according to claim 1, wherein in a case where the processor determines that the request is not acceptable, the transmitter transmits alternative network quality requirements to the terminal.

3. The communication device according to claim 1, wherein the receiver receives location information of the terminal from the terminal, and
   the processor is configured to calculate network quality requirements available to the terminal based on the location information.

4. The communication device according to claim 1, wherein the plurality of parameters included in the network quality requirements includes at least one of a parameter associated with a latency, a jitter, an uplink data rate, and a downlink data rate.

5. A communication method executed by a communication device capable of communicating with a terminal that performs wireless communication, the communication method comprising:
   receiving a request for network quality requirements from the terminal;
   calculating network quality requirements available to the terminal;
   comparing the request with the available network quality requirements to determine whether the request is acceptable; and
   transmitting a result of the determination to the terminal,
   wherein the request includes a plurality of requirement sets, and each requirement set of the plurality of requirement sets is defined by a plurality of values corresponding to a respective plurality of parameters included in the network quality requirements, and
   wherein the communication device determines each parameter of the plurality of parameters of one or more requirement sets from among the plurality of requirement sets, the one or more requirement sets being defined by the plurality of values whose levels are lower than respective levels of a plurality of values corresponding to the respective plurality of parameters that defines the available network quality requirements, as a target subject to determination.

* * * * *